DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 26, 1970

874 O.G. 1021

T874,012

PROCESS FOR HARDENING AN ALUMINUM ALLOY MEMBER

Robert E. Clark, Waynesboro, Va., assignor to E. I. du Pont de Nemours and Company, Wilmington, Del., a corporation of Delaware

Filed Oct. 2, 1969, Ser. No. 863,215
**Int. Cl. C21d *1/46***
U.S. Cl. 148—20
1 Sheet Drawing. 5 Pages Specification

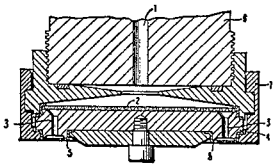

A solution-distribution plate of a highly heat conductive [e.g., at least about 500, preferably 900–1300 B.t.u./(hr.) (sq. ft.) (° F./ft.)] aluminum alloy (preferably 2024 aluminum alloy) is hardened to a Brinnel hardness of at least about 100, by: (1) heating a solution-distribution plate constructed of the aforesaid heat conductive aluminum alloy in a molten salt bath at about 800° F. ±25° F. for about 3 minutes, and quenching the heated distribution plate by rapidly immersing it in cold (e.g., below about 60° F.±10° F.) water. The preferred salt bath has approximately the following composition: 40% $KNO_3$, 50% $NaNO_2$, and 10% NaOH. The distribution plate, identified by the numeral 4 in the drawing, so prepared, when used in conjunction with a conventional dry spinning spinneret assembly, desirably reduces the solution temperature gradient across the spinneret, as well as providing suitable resistance to deformation in handling and creep under load during use.

May 26, 1970 R. E. CLARK T874,012
PROCESS FOR HARDENING AN ALUMINUM ALLOY MEMBER
Filed Oct. 2, 1969
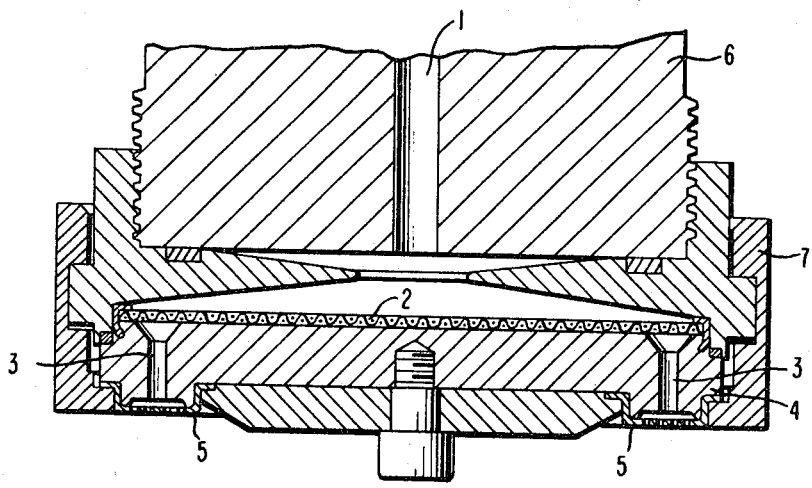
INVENTOR
ROBERT E. CLARK
BY Eugene Berman
ATTORNEY